US012623663B2

(12) United States Patent
Park et al.

(10) Patent No.: US 12,623,663 B2
(45) Date of Patent: May 12, 2026

(54) HYBRID ELECTRIC VEHICLE AND VIBRATION CONTROL METHOD THEREOF

(71) Applicants: HYUNDAI MOTOR COMPANY, Seoul (KR); KIA CORPORATION, Seoul (KR)

(72) Inventors: Key Chun Park, Yongin-si (KR); Sung Il Jung, Busan (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 127 days.

(21) Appl. No.: 18/611,424

(22) Filed: Mar. 20, 2024

(65) Prior Publication Data

US 2025/0136118 A1    May 1, 2025

(30) Foreign Application Priority Data

Nov. 1, 2023    (KR) ........................ 10-2023-0149431

(51) Int. Cl.
| | |
|---|---|
| *B60W 30/20* | (2006.01) |
| *B60W 10/06* | (2006.01) |
| *B60W 10/08* | (2006.01) |
| *B60W 20/00* | (2016.01) |
| *B60W 30/192* | (2012.01) |

(52) U.S. Cl.
CPC ............ *B60W 30/20* (2013.01); *B60W 10/06* (2013.01); *B60W 10/08* (2013.01); *B60W 20/00* (2013.01); *B60W 30/192* (2013.01); *B60W 2030/206* (2013.01); *B60W 2510/0685* (2013.01); *B60W 2510/08* (2013.01)

(58) Field of Classification Search
CPC ...... B60W 30/20; B60W 10/06; B60W 10/08; B60W 20/00; B60W 30/192; B60W 2030/206; B60W 2510/0685; B60W 2510/08; B60W 20/40; Y02T 10/62; H02P 6/16; B60Y 2200/92
See application file for complete search history.

(56) References Cited

U.S. PATENT DOCUMENTS

| | | | |
|---|---|---|---|
| 6,778,899 | B2 | 8/2004 | Weimer |
| 8,773,054 | B2 | 7/2014 | Goto |
| 9,677,528 | B2 | 6/2017 | Miwa |

(Continued)

FOREIGN PATENT DOCUMENTS

| | | |
|---|---|---|
| JP | 2004092457 A | 3/2004 |
| JP | 2012136202 A | 7/2012 |

(Continued)

*Primary Examiner* — Brian P Sweeney
(74) *Attorney, Agent, or Firm* — Lempis Summerfield Katz LLC

(57) ABSTRACT

A hybrid electric vehicle and a vibration control method thereof is provided. The vibration control method of the hybrid electric vehicle includes: receiving rotor angle information of a motor generated based on information detected by a resolver; receiving first engine rotation-angle information of an engine generated based on information detected by a cam angle sensor or a crank angle sensor; generating engine rotation-angle candidates based on the rotor angle information; and identifying a second engine rotation-angle based on the engine rotation-angle candidates and the first engine rotation-angle information.

8 Claims, 14 Drawing Sheets

(56)　　　　　　References Cited

U.S. PATENT DOCUMENTS

| | | | |
|---|---|---|---|
| 10,040,444 | B2 | 8/2018 | Eo |
| 10,272,904 | B2 | 4/2019 | Eo |
| 2013/0271051 | A1 * | 10/2013 | Goto ..................... B60L 3/0038 |
| | | | 318/400.26 |
| 2016/0069316 | A1 | 3/2016 | Miwa |
| 2017/0166190 | A1 | 6/2017 | Eo |
| 2018/0319388 | A1 | 11/2018 | Eo |
| 2023/0347862 | A1 | 11/2023 | Kwak |

FOREIGN PATENT DOCUMENTS

| | | | | |
|---|---|---|---|---|
| JP | 6032352 | B2 | 11/2016 | |
| JP | 2023000140 | A | 1/2023 | |
| KR | 101765627 | B1 | 8/2017 | |
| KR | 102463442 | B1 * | 11/2022 | ........... B60W 10/08 |
| KR | 20230153087 | A | 11/2023 | |

\* cited by examiner $CA = \Theta_m + 360, \; \Theta_m$

HYBRID ELECTRIC VEHICLE AND VIBRATION CONTROL METHOD THEREOF

CROSS REFERENCE TO RELATED APPLICATION

The present application claims priority to Korean Patent Application No. 10-2023-0149431, filed Nov. 1, 2023, the entire contents of which are incorporated herein for all purposes by this reference.

BACKGROUND

Field of the Disclosure

The disclosure relates to a hybrid electric vehicle, and more particularly, to a hybrid electric vehicle and a vibration control method thereof.

Description of the Related Art

As an alternative to an internal combustion engine vehicle, an eco-friendly vehicle such as a pure electric vehicle, a hybrid electric vehicle, or a fuel cell electric vehicle is called a motor-driven vehicle. This is because the eco-friendly vehicle employs an electric motor as a driving source for driving the vehicle. Among such vehicles, the hybrid electric vehicle includes both an internal combustion engine and a motor, and is thus required to detect rotation angles of the internal combustion engine and the motor for each drive control.

In this case, to detect an absolute angular position of a rotor of the motor, a resolver is used as a position sensor. The resolver may be used as the position sensor for a drive motor in the field of requiring high performance and high precision drive like an electric vehicle because it has higher mechanical strength and durability than an encoder.

In the case of the internal combustion engine, if the rotation angle is not detected, it is impossible to measure the position (e.g., top dead center) of the crankshaft. Thus, a problem arises in that the fuel injection amount, injection timing, and ignition timing of the engine are not accurately identified.

In this regard, a technology has been devised to replace a crank angle sensor of the engine by the resolver of the motor to generate virtual crank-angle sensor information and control the engine based on the virtual crank-angle sensor information. However, there is a disadvantage in that this conventional technology is not applicable to most motors with multiple pole-pairs because mechanical matching between resolver signals and the positions of multiple crank angles is not taken into account. Further, because the position of a 4-stroke engine has a rotation angle ranging from 0 to 720 degrees, there are disadvantages in converting the mechanical angle of the resolver to the crank angle of the internal combustion engine. Additionally, the signal delay that occurs when information is exchanged between control units through controller area network (CAN) communication is not considered.

SUMMARY

Accordingly, in this field of technology, it is desirable to apply solutions to motors with a large number of pole-pairs. Additionally, it is desirable to accurately measure the angular position of the internal combustion engine in consideration of the conversion of the mechanical angle into the crank angle and the signal delay in the CAN communication.

The present disclosure is proposed to solve the foregoing problems. Aspects of the present disclosure are to provide a hybrid electric vehicle and an engine angular-position estimating method thereof, which are applicable to a motor with a large number of pole-pairs.

Other aspects of the present disclosure are to provide a hybrid electric vehicle and an engine angular-position estimating method thereof, in which conversion of a resolver mechanical angle into an engine crank angle and a signal delay that occurs when information is exchanged between control units through controller area network (CAN) communication are taken into account.

Still another aspect of the present disclosure is to provide a hybrid electric vehicle in which an angular position of an engine is accurately estimated and a motor compensates the engine for the torque precisely based on the estimated angular position of the engine.

Technical problems to be solved in the present disclosure are not limited to the aforementioned technical problems. Other unmentioned technical problems can be more clearly understood from the following description by a person having ordinary knowledge in the art to which the present disclosure pertains.

According to an embodiment of the present disclosure, a vibration control method of a hybrid electric vehicle is provided. The method includes receiving rotor angle information of a motor of the vehicle generated based on information detected by a resolver and includes receiving first engine rotation-angle information generated based on information detected by a cam angle sensor or a crank angle sensor. The method further includes generating engine rotation-angle candidates based on the rotor angle information and identifying a second engine rotation-angle based on the engine rotation-angle candidates and the first engine rotation-angle information.

In this case, the number of engine rotation-angle candidates may be based on the number of poles of a motor rotor magnet of the hybrid electric vehicle.

In this case, identifying the second engine rotation-angle may include identifying first and second indexes based on the engine rotation-angle candidates and the first engine rotation-angle information. Additionally, identifying the second engine rotation-angle may include identifying the second engine rotation-angle based on the first and second indexes.

In this case, the vibration control method may further include storing the first and second indexes in a memory and estimating the second engine rotation-angle again based on the stored first and second indexes and the rotor angle information of the motor the next time an engine of the hybrid electric vehicle is started after the engine is turned off.

In this case, the first and second indexes may include values for indicating one of the engine rotation-angle candidates.

In this case, the vibration control method may further include controlling an engine of the hybrid electric vehicle based on the second engine rotation-angle to control the hybrid electric vehicle to travel.

According to an embodiment of the present disclosure, a hybrid electric vehicle is provided. The vehicle includes a rotor-angle operation unit configured to generate rotor angle information of a motor of the vehicle based on information detected by a resolver and includes an engine rotation-angle operation unit configured to generate first engine rotation-angle information based on information detected by a cam angle sensor or a crank angle sensor. The vehicle further includes a synchronization operation unit configured to generate engine rotation-angle candidates based on the rotor angle information and to identify a second engine rotation-angle based on the engine rotation-angle candidates and the first engine rotation-angle information.

In this case, the number of engine rotation-angle candidates may be based on the number of poles of a motor rotor magnet of the hybrid electric vehicle.

In this case, the synchronization operation unit may identify first and second indexes based on the engine rotation-angle candidates and the first engine rotation-angle information and may identify the second engine rotation-angle based on the first and second indexes.

In this case, the synchronization operation unit may store the first and second indexes in a memory. Additionally, the synchronization operation unit may estimate the second engine rotation-angle again based on the stored first and second indexes and the rotor angle information of the motor next time an engine of the hybrid electric vehicle is started after the engine is turned off.

In this case, the first and second indexes may include values for indicating one of the engine rotation-angle candidates.

In this case, the hybrid control unit may control the hybrid electric vehicle to travel by controlling the engine of the hybrid electric vehicle based on the second engine rotation-angle.

According to the present disclosure, the angular position of the engine is estimated based on the resolver signal of the motor, where the resolver signal has high resolution and is strong. As a result, performing main control of the engine with high resolution at accurate timing is achieved.

Further, the crank angle of an engine is processed in the same manner as previously done to perform the internal control of the engine. The motor synchronizes the angle position of the motor with the angle position of the engine, thereby smoothly performing vibration control that counteracts changes in the torque and speed of the engine through the motor.

Further, the control of the engine is performed based on the existing engine crank angle signal processing, the control of the motor is performed based on the existing resolver-based motor position signal, and the hybrid control unit that distributes the torques of the engine and the motor distributes instantaneous torque in consideration of the phases of the engine and the motor. As a result, the instantaneous torque of the motor can offset the change in the instantaneous torque of the engine, thereby smoothly performing the vibration control that controls the change in the torque and speed of the engine through the motor at low revolutions per minute (RPM).

DETAILED DESCRIPTION

Figure 1:
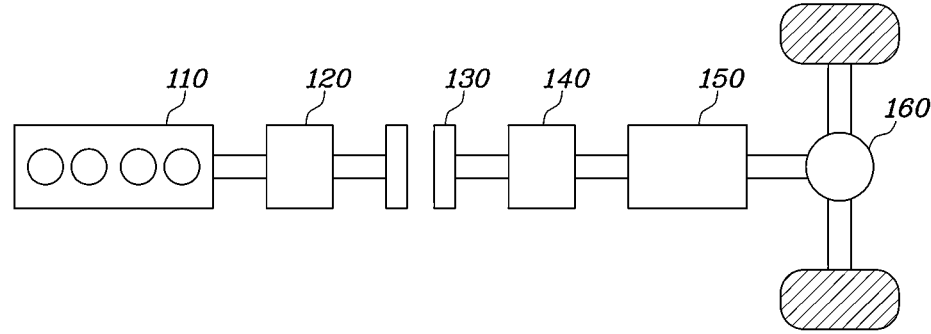
FIG. 1 illustrates a configuration of a powertrain in a hybrid electric vehicle according to an embodiment of the present disclosure.

Hereinafter, embodiments of the present disclosure are described in detail with reference to the accompanying drawings, in which the same or similar components are denoted by the same reference numerals even though they are depicted in different drawings. Additionally, redundant descriptions thereof have been omitted. Suffixes such as "module" and "unit" put after components in the following description are used for convenience of description, and do not have meaning or functions discriminated from each other. Further, in terms of describing the embodiments of the present disclosure, detailed descriptions of related art have been omitted where they would have made the subject matter of the embodiments of the present disclosure rather unclear. In addition, the accompanying drawings are provided only to enhance understanding of the embodiments of the present disclosure and are not intended to limit technical ideas of the present disclosure. Therefore, it should be understood that the accompanying drawings include all modifications, equivalents, and substitutions within the scope and sprit of the present disclosure.

Terms such as "first" and "second" may be used to describe various components, but the components should not be limited by the above terms. In addition, the above terms are used only for the purpose of distinguishing one component from another.

When it is described that one component is "connected" or "joined" to another component, it should be understood that the one component may be directly connected or joined to another component, but additional components may be present therebetween. However, when one component is described as being "directly connected," or "directly coupled" to another component, it should be understood that additional components may be absent between the one component and another component.

Unless the context clearly dictates otherwise, singular forms include plural forms as well.

In the present disclosure, it should be understood that terms such as "include", "comprise", or "have" indicate that a feature, a number, a step, an operation, a component, a part, or the combination thereof described in the embodiments is present. Such terms do not preclude a possibility of the presence or addition of one or more other features, numbers, steps, operations, components, parts or combinations thereof, in advance.

Further, terms such as "unit" or "control unit" forming part of the names of a motor control unit (MCU), a hybrid control unit (HCU), and the like, are merely terms that are widely used in the naming of a controller for controlling a specific function of a vehicle, and should not be construed as meaning a generic function unit. For example, each control unit may include a communication device that communicates with other control units or sensors, in order to control its own functions, a memory that stores an operating system, logic commands, and input/output information, and one or more processors that perform determination, calculation, decision, and the like, which is necessary for the control of the function that is responsible therefor.

When a controller, component, device, element, part, unit, module, or the like of the present disclosure is described as having a purpose or performing an operation, function, or the like, the controller, component, device, element, part, unit, or module should be considered herein as being "configured to" meet that purpose or perform that operation or function. Each controller, component, device, element, part, unit, module, and the like may separately embody or be included with a processor and a memory, such as a non-transitory computer-readable media, as part of the apparatus.

Prior to describing a method of controlling a hybrid electric vehicle according to embodiments of the present disclosure, the structure and control system for the hybrid electric vehicle applicable to the embodiments is first described.

FIG. 1 illustrates a configuration of a powertrain in a hybrid electric vehicle according to an embodiment of the present disclosure.

Referring to FIG. 1, the powertrain of the hybrid electric vehicle employs a parallel type hybrid system in which two motors 120 and 140 and an engine clutch 130 are mounted between an internal combustion engine (ICE) 110 and a transmission 150. Such a parallel type hybrid system may also be called a transmission mounted electric drive (TMED) hybrid system because the motor 140 is always connected to an input terminal of the transmission 150. The first motor 120 is placed between the engine 110 and a first end of the engine clutch 130. An engine shaft of the engine 110 and a first motor shaft of the first motor 120 are directly connected to each other and always rotate together.

A second motor shaft of the second motor 140 has a first end connected to a second end of the engine clutch 130 and a second end connected to the input terminal of the transmission 150.

The second motor 140 may have a greater power output than the first motor 120 and may serve as a drive motor. Further, the first motor 120 may function as a starting motor that cranks the engine 110 when the engine 110 is started, may recover the rotational energy of the engine 110 by power generation when the engine is off, and may generate power with the power of the engine 110 while the engine 110 is operating.

In the hybrid electric vehicle (HEV) including the powertrain as shown in FIG. 1, when a driver depresses an accelerator pedal after starting the vehicle (e.g., HEV Ready), the second motor 140 is first driven with power from a battery (not shown) while the engine clutch 130 is being open. The power from the second motor 140 is then transmitted to the wheels of the vehicle via a transmission 150 and a final drive (FD) 160, thereby causing the wheels to move (i.e., an electric vehicle (EV) mode). As the vehicle gradually accelerates and requires a larger driving force, the first motor 120 may operate to crank the engine 110.

After the engine 110 is started, the engine clutch 130 is engaged when a difference in rotational speed between the engine 110 and the second motor 140 falls within a specific range thereby causing the engine 110 and the second motor 140 to rotate together (i.e., transition from the EV mode to an HEV mode). Then, the output of the second motor 140 is decreased and the output of the engine 110 is increased by a torque blending process, thereby satisfying a driver's required torque. In the HEV mode, the required torque may be satisfied by the engine 110 and the difference between the engine torque and the required torque may be compensated by at least one of the first motor 120 and the second motor 140. For example, when the engine 110 outputs a torque higher than the required torque in consideration of the efficiency of the engine 110, the first motor 120 or the second motor 140 may perform power generation as much as a surplus engine torque. On the other hand, when the engine torque is lower than the required torque, at least one of the first motor 120 and the second motor 140 may output a torque to compensate for the deficiency.

When a preset engine-off condition is satisfied due to the deceleration or the like of the vehicle, the engine clutch 130 is opened and the engine 110 is stopped (i.e., transition from the HEV mode to the EV mode). During the deceleration, the battery is charged with the driving force of the wheels by the second motor 140, which is called braking energy recovery or regenerative braking.

In general, the transmission 150 may include a stepped transmission, or a multi-plate clutch, e.g., a dual clutch transmission (DCT).

Figure 2:
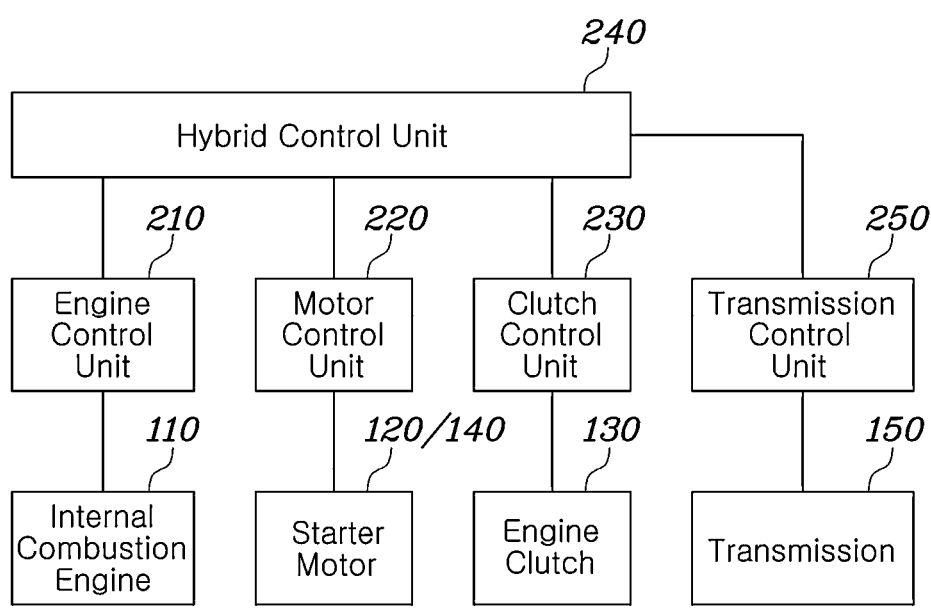
FIG. 2 illustrates a configuration of a control system in a hybrid electric vehicle according to an embodiment of the present disclosure.

FIG. 2 illustrates a configuration of a control system in a hybrid electric vehicle according to an embodiment of the present disclosure.

Referring to FIG. 2, in the hybrid electric vehicle to which embodiments of the present disclosure are applicable, the internal combustion engine 110 may be controlled by an engine control unit 210, the torques of the first motor 120 and the second motor 140 may be controlled by a motor control unit (MCU) 220, and the engine clutch 130 may be controlled by a clutch control unit 230, respectively.

The engine control unit 210 is also referred to as an engine management system (EMS). The engine control unit 210 may use the engine's virtual angle sensor information generated by the motor control unit 220 to identify the fuel injection amount, injection timing, and ignition timing of the engine 110.

Further, the transmission 150 is controlled by a transmission control unit 250.

The motor control unit 220 may control a gate drive unit (not shown) with a pulse width modulation (PWM) control signal based on a motor angle, a phase voltage, a phase current, a required torque, and the like of each of the motors 120 and 140. The gate drive unit may control an inverter (not shown) for driving each of the motors 120 and 140 based on the control signal. The motor control unit 220 may acquire information about the motor angle (or the rotation angle) through a resolver (not shown) provided in each of the motors 120 and 140.

Each control unit is connected to its high-level control unit, i.e., a hybrid controller unit (HCU) 240, which controls the overall powertrain, including a mode switching process. The hybrid controller unit 240 may provide information, which is necessary for controlling the engine clutch when changing the driving mode, shifting gears, and/or controlling the engine to stop. The hybrid control unit 240 may also perform an operation based on the control signal.

For example, the hybrid control unit 240 identifies whether to perform switching between EV-HEV modes or between CD-CS modes (in the case of a PHEV) based on the operating state of the vehicle. To this end, the hybrid control unit 240 identifies timing to open the engine clutch 130 and performs hydraulic control at that timing. Further, the hybrid control unit 240 identifies the states (lock-up, slip, open, and the like) of the engine clutch 130 and controls timing to stop the fuel injection of the engine 110. In addition, the hybrid control unit 240 may transmit a torque command for controlling the torque of the first motor 120 to the motor control unit 220 to control the engine stop, thereby controlling the rotational energy recovery of the engine. Further, the hybrid control unit 240 may identify the states of each of the drive sources 110, 120, and 140 to satisfy the required torque. Additionally, the hybrid control unit 240 may identify the required driving forces to be shared among the drive sources 110, 120, and 140 based on the identified states, thereby transmitting the torque command to the control units 210 and 220 for controlling the drive sources.

It should be apparent to those having ordinary skill in the art that the foregoing connections between the control units and the foregoing functions/divisions of the control units are merely exemplary and not limited to their naming. For example, the hybrid control unit 240 may be replaced by any one of the other control units, or its functions may be distributively provided by two or more of the other control units.

The foregoing configurations that are shown in FIGS. 1 and 2 are merely examples of the hybrid electric vehicle, and the hybrid electric vehicle applicable to the embodiments is not limited to such a structure. For example, it is assumed in FIG. 1 that the first motor 120 and the engine 110 are directly connected to each other. However, the first motor 120 and the engine 110 may be implemented to be connected using a predetermined connection means, such as a pulley and a belt.

Figure 3:
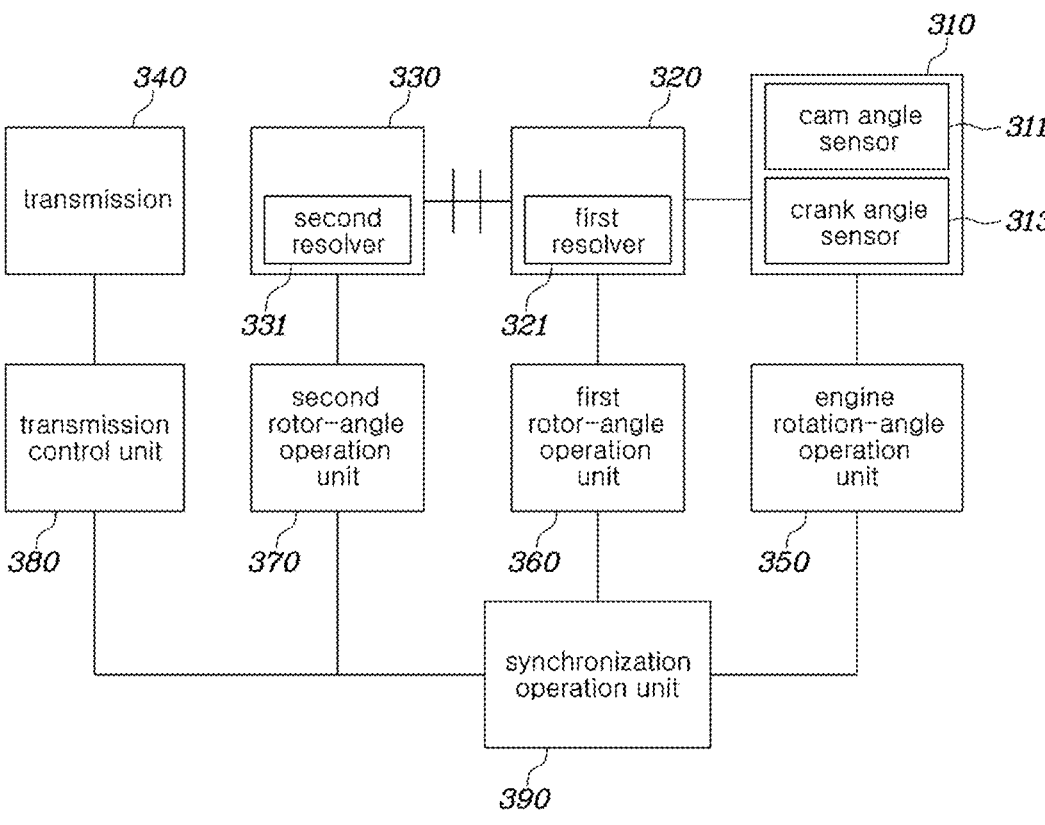
FIG. 3 is a block diagram of an engine angular-position estimating system according to an embodiment of the present disclosure.

FIG. 3 is a block diagram of an engine angular-position estimating system according to an embodiment of the present disclosure.

The engine angular-position estimation system according to the embodiment may be a hybrid electric vehicle. Additionally, at least one component making up the engine angular-position estimation system according to the embodiment may be implemented in each control unit of the hybrid electric vehicle.

Referring to FIG. 3, the engine angular-position estimating system according to the embodiment may include an engine 310, a first motor 320, a second motor 330, a transmission 340, an engine rotation-angle operation unit 350, a first rotor-angle operation unit 360, a second rotor-angle operation unit 370, a transmission control unit 380, and a synchronization operation unit 390.

The engine 310 includes a cam angle sensor 311 for detecting a cam angle, and a crank angle sensor 313 for detecting a crank angle.

The cam angle of the engine detected by the cam angle sensor 311 and the crank angle of the engine detected by the crank angle sensor 313 are transmitted to the sensor-based engine rotation-angle operation unit 350.

The first and second motors 320 and 330 include first and second resolvers 321 and 331 for measuring resolver angles, respectively.

The transmission 340 is controlled by the transmission control unit 380.

The sensor-based engine rotation-angle operation unit 350 identifies the rotation angle of the engine based on the cam angle of the engine detected by the cam angle sensor 311 and the crank angle of the engine detected by the crank angle sensor 313.

In this case, the sensor-based engine rotation-angle operation unit 350 may be an engine control unit (ECU) of a vehicle.

In this case, the rotation angle of the engine identified by the sensor-based engine rotation-angle operation unit 350 refers to a value to be used by the synchronization operation unit 390 to finally identify the rotation angle of the engine. In the specification, the rotation angle of the engine identified by the sensor-based engine rotation-angle operation unit 350 is defined as a first engine rotation angle. The rotation angle of the engine finally identified by the synchronization operation unit 390 is defined as a second engine rotation angle.

The first and second rotor operation units 360 and 370 identify the rotor angles of the first and second motors 320 and 330 based on information about the rotor positions of the first and second motors 320 and 330, received from the first and second resolvers 321 and 322, respectively. As mentioned above, the first and second motors 320 and 330 include the first and second resolvers 321 and 331, respectively.

In this case, the first and second rotor-angle operation units 360 and 370 may be first and second motor control units (MCU) of a vehicle, respectively.

The synchronization operation unit 390 receives the rotor angle information about the first motor 320 from the first rotor-angle operation unit 360, receives the first engine rotation angle from the sensor-based engine rotation-angle operation unit 350, and identifies the second engine rotation angle based on the received information.

In this case, the synchronization operation unit 390 may be a hybrid control unit (HCU) of a vehicle.

It is generally known that a relationship between the electrical angle $\theta_e$ and the mechanical angle $\theta_m$ of a resolver measured by the first resolver 321 of the first motor 320 directly connected to the engine 310 is $\theta_e$=pole-pair number*$\theta_m$. However, in practice, one electrical angle $\theta_e$ of the resolver is matched to as many mechanical angles $\theta_m$ of the crank as the number of pole-pairs.

Thus, the mechanical angle $\theta_m$ matched to the electrical angle $\theta_e$ of one resolver can be obtained by the following Equation 1.

$$\theta_m = \theta_e/\text{pole-pair number} + 360/\text{pole-pair number} * \qquad \text{[Equation 1]}$$
$$N \text{ (where, } N = 0, 1 - \ldots, \text{pole-pair number} - 1)$$

In Equation 1, $\theta_m$ indicates the mechanical angle, and De indicates the electrical angle of the resolver. Further, the pole-pair number indicates the number of magnet pole-pairs of the motor rotor.

For example, when the electrical angle $\theta_e$ of the resolver is 40° and the number of pole-pairs is 4, the mechanical angles may be (40/4+360/4*0)=10 by substituting 0 for N in Equation 1. The mechanical angles may also be (40/4+360/

4*1)=100 by substituting 1 for N, (40/4+360/4*2)=190 by substituting 2 for N, and (40/4+360/4*3)=280 by substituting 3 for N. The engine rotation angle has a range of 720 degrees. Further, because the rotation angle of the engine ranges up to 720 degrees, not only the mechanical angles of 10, 100, 190, and 280, but also the angles of 370, 460, 550, and 640 degrees, which are respectively obtained by adding 360 degrees to these angles of 10, 100, 190, and 280 degrees, may be candidates for the rotation angle of the engine. In other words, the mechanical angles, which can be estimated from, i.e., matched to, one electrical angle of the resolver, are present as many as the number of pole-pairs. The rotation angle of the engine is present as many as the number of poles of a motor rotor magnet, which is twice the number of pole-pairs. Therefore, it is necessary for identifying an actual rotation angle position of the engine.

In particular, as shown in FIG. 3, in a system structure including low-level control units such as the engine rotation-angle operation unit 350, the motor control units 360 and 370, and the high-level hybrid control unit 390, controller area network (CAN) communication is used to transmit and receive information between the high-level control unit 390 and the lower-level control units 350, 360, and 370 that directly acquire a crank angle sensor signal and a resolver signal. Additionally, a communication delay may occur while transmitting and receiving information between the upper control unit 390 and the low-level control units 350, 360, and 370. Therefore, an engine position signal and a motor position signal are required to be synchronized in consideration of the communication delay.

Below, a method of estimating the rotation angle of the engine in consideration of the communication delay is described.

Figure 4:
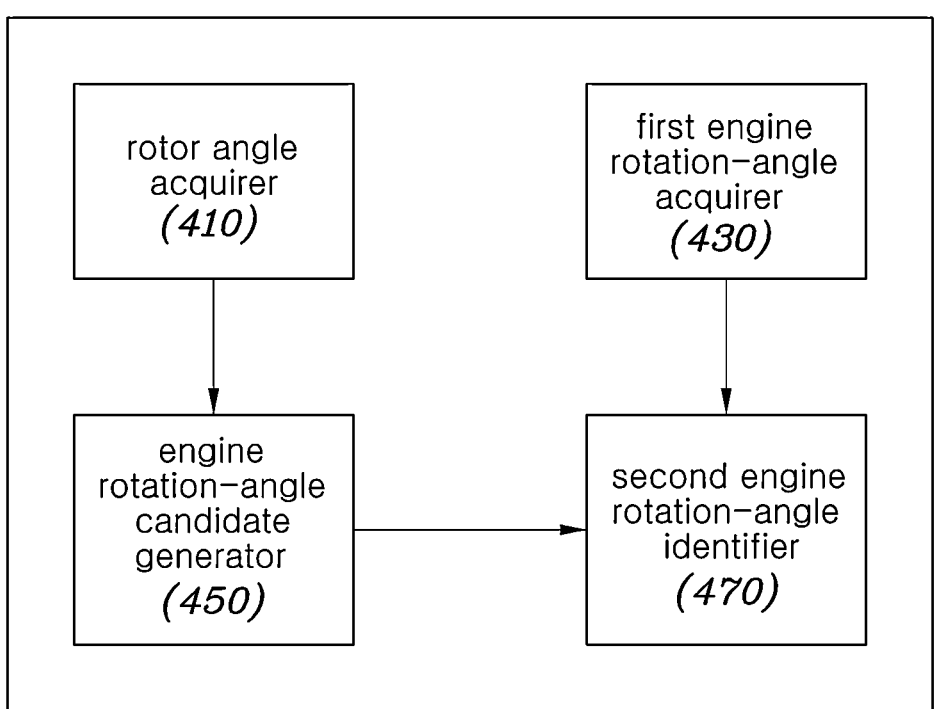
FIG. 4 is a block diagram of a synchronization operation unit of the system in FIG. 3.

FIG. 4 is a block diagram of the synchronization operation unit 390 in FIG. 3.

Referring to FIG. 4, the synchronization operation unit 390 includes a rotor angle acquirer 410, a first engine rotation-angle acquirer 430, an engine rotation-angle candidate generator 450, and a second engine rotation-angle identifier 470.

The rotor angle acquirer 410 acquires a resolver electrical angle $\theta_e$ of the first motor 320 directly connected to the engine 310.

The first engine rotation-angle acquirer 430 acquires information about a first engine rotation-angle (Cacan) from the sensor-based engine rotation-angle operation unit 350.

In this case, the first engine rotation-angle refers to the rotation angle of the engine identified by the cam angle sensor 311 or the crank angle sensor 313. However, the first engine rotation-angle (Cacan) received in the sensor-based engine rotation-angle operation unit 350 has a time delay a due to the characteristics of CAN communication. Therefore, the second engine rotation-angle identifier 470 (as described below) acquires the engine rotation-angle without the time delay.

The engine rotation-angle candidate generator 450 generates an engine rotation-angle (CA) candidate based on the resolver electrical angle $\theta_e$ acquired by the rotor angle acquirer 410.

When the crank mechanical angle $\theta_m$ matched to one resolver electrical angle $\theta_e$ in the foregoing Equation 1 is expressed in terms of the number of magnet poles P of the motor rotor, which is twice the number of pole-pairs, it is shown as Equation 2 below.

$$\theta_m = \left\{ \theta \mid (\theta_e + 360*N)/(P/2) \right\}, \qquad \text{[Equation 2]}$$

$$(wh\text{--}re, \ N = 0, \ 1, \ \ldots, \ P/2 - 1)$$

In the foregoing Equation 2, $\theta_m$ indicates the mechanical angle of the crank, $\theta_e$ indicates the electrical angle of the resolver, and P indicates the number of poles of a motor rotor magnet.

Figure 5A:
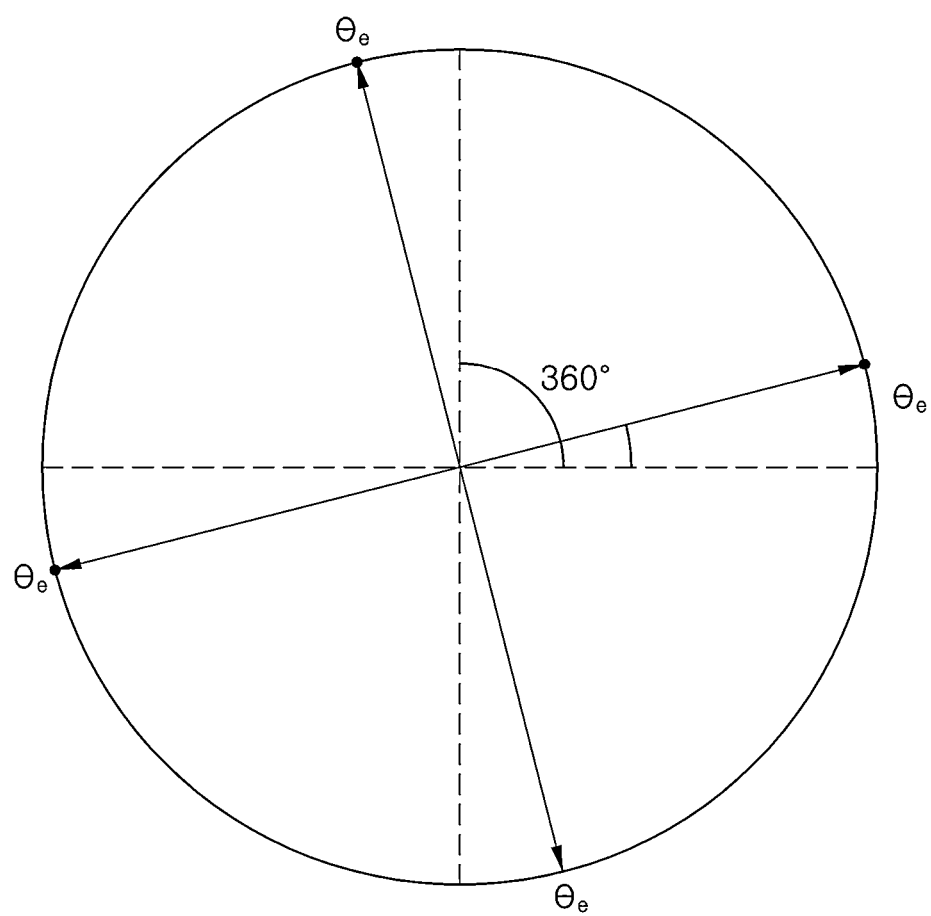
FIG. 5A illustrates an electrical angle of a motor rotor.
Figure 5B:
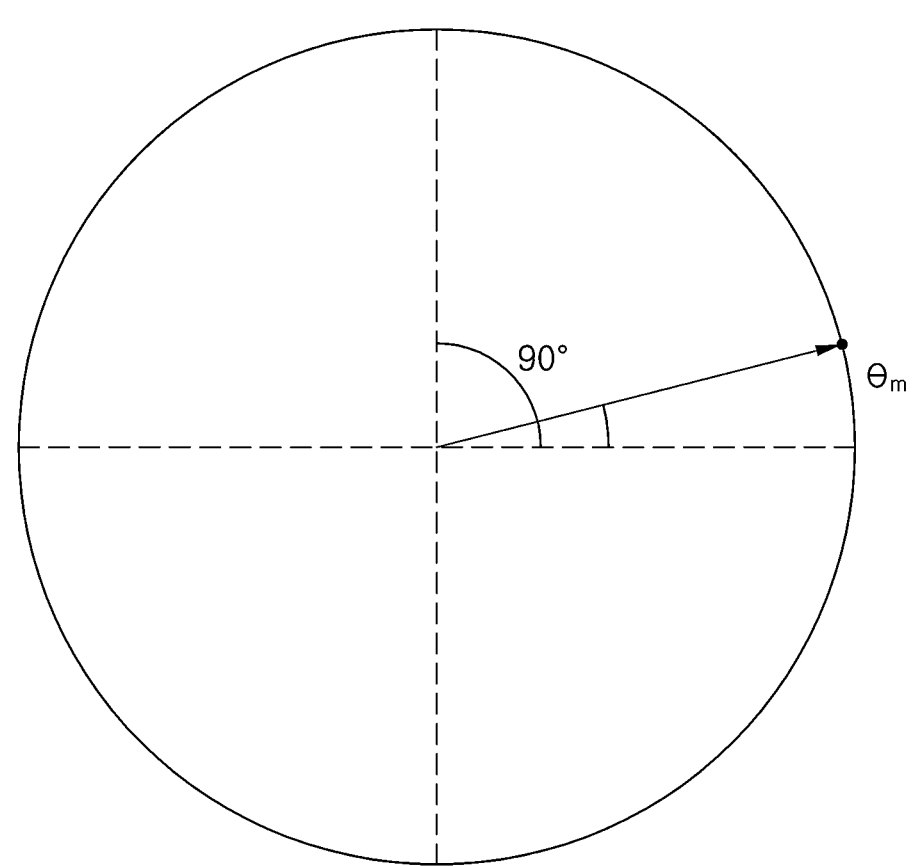
FIG. 5B illustrates a mechanical angle corresponding to the electrical angle of FIG. 5A.

FIG. 5A illustrates an electrical angle of a motor rotor and FIG. 5B illustrates a mechanical angle corresponding to the electrical angle of FIG. 5A. In this case, FIG. 5A shows the electrical angle of the motor of which the number of pole-pairs is 4. FIG. 5B shows the corresponding mechanical angle matched to the electrical angle. Referring to FIGS. 5A and 5B, because there are as many electrical angles of one motor rotor as the number of pole-pairs, additional operations are required to select one of the electrical angles in order to estimate the mechanical angle matched to the electrical angle of the actual motor rotor.

Figure 6A:
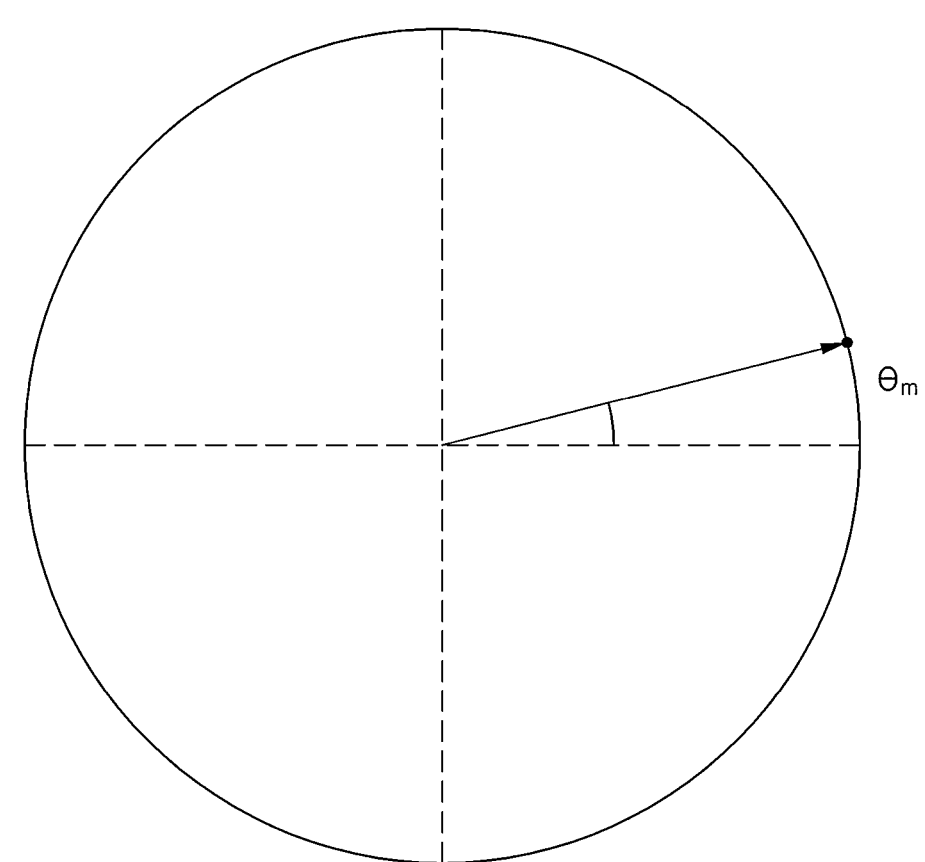
FIG. 6A illustrates a mechanical angle of a motor rotor.
Figure 6B:
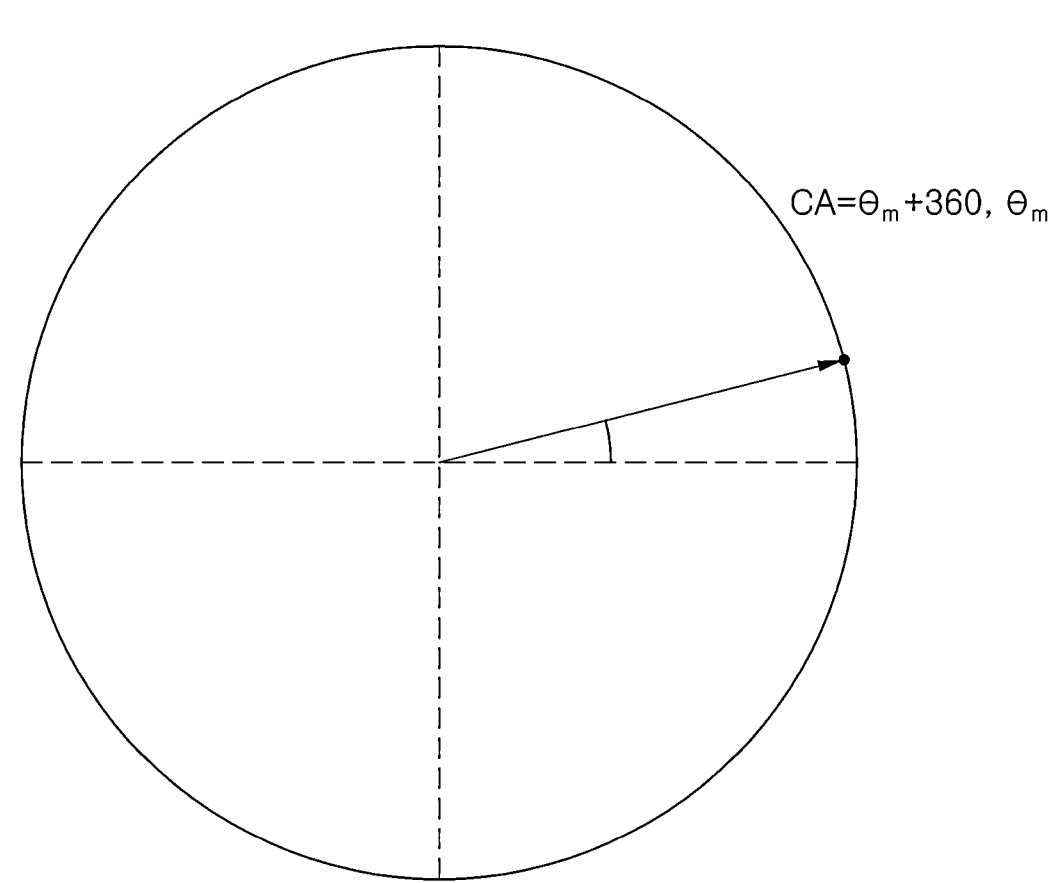
FIG. 6B illustrates an engine crank angle corresponding to the mechanical angle of the motor rotor of FIG. 6A.

Consider the rotation angle of the engine as the crank angle (CA). Referring to FIGS. 6A and 6B, the CA is within the range of two rotations (0 to 720 degrees). Thus, two CAs are matched to one mechanical angle of the crank.

In other words, a relationship between the candidates for the CA and the electrical angle $\theta_e$ of the motor resolver is established as shown in Equation 3 below.

$$\text{Candidates for } CA = \qquad \text{[Equation 3]}$$

$$\left\{ \theta \mid (\theta_e + 360*N)/(P/2), \ (\theta_e + 360*N)/(P/2) + 360 \right\},$$

$$(\text{where}, \ N = 0, 1, \ldots, P/2 - 1)$$

In Equation 3, the candidates for the CA indicate the candidates for the rotation angle of the engine, $\theta_e$ indicates the electrical angle of the resolver, and P indicates the number of poles of a motor rotor magnet. Referring to Equation 3, one electrical angle $\theta_e$ of the resolver may be matched to P candidates for the engine rotation angle (i.e., P candidates for the CA).

In this case, the candidates for the CA generated by the engine rotation-angle candidate generator 450 may be represented as a matrix of (P/2)×2.

The second engine rotation-angle identifier 470 identifies a second engine rotation-angle by comparing the plurality of CAs generated by the engine rotation-angle candidate generator 450 with the first engine rotation-angle (Cacan) acquired by the first engine rotation-angle acquirer 430.

Because the first engine rotation-angle (Cacan) acquired by the first engine rotation-angle acquirer 430 has a time delay a due to the characteristics of the CAN communication, the second engine rotation-angle may be selected as a value that has a minimum difference from the first engine rotation-angle (Cacan) among the plurality of CA candidates selected as a result of Equation 3.

Therefore, when the first engine rotation-angle (Cacan) is CA plus a (i.e., the time delay), and an interval between the candidates for the CA identified in Equation 3 is greater than x, the second engine rotation-angle CA may be obtained by the following Equation 4.

$$CA = \min \left[ abs \left\{ CAcan - \right. \right. \qquad \text{[Equation 4]}$$

$$\left. \left. \left( \theta \mid (\theta_e + 360 * N)/(P/2), \quad (\theta_e + 360 * N)/(P/2) + 360 \right) \right\} \right],$$

$$\left( \text{where}, \quad N = 0, \ 1, \dots, \ P/2 - 1 \right)$$

In Equation 4, CA indicates the rotation angle of the engine, $\theta_e$ indicates the electrical angle of the resolver, and P indicates the number of poles of a motor rotor magnet. Referring to Equation 4, the rotation angle having the minimum difference from the first engine rotation-angle (Cacan) among the candidates for the engine rotation-angle may be selected as the final engine rotation-angle (i.e., the second engine rotation-angle).

For example, when the engine rotates at 1000 revolutions per minute (RPM) and the delay in the CAN communication between the engine control unit 210 and the hybrid control 240 unit is 1 msec, an angle error occurs due to a time delay of 360*1000/60*0.001=about 6 degrees. When the motor has 8 poles, a difference in the rotation angle between the CA candidates is 720/8=90 degrees, thereby satisfying a precondition for applying Equation 4. When the second engine rotation-angle CA is obtained by Equation 4, first and second indexes may be generated based on the obtained value and stored in a memory. The first index (index1) corresponds to the value of N matched to the value of the CA obtained in Equation 4. The second index (index2) indicates whether two candidates for the CA, which correspond to one value of N, have a rotation angle less than or greater than 360 degrees, i.e., whether or not the rotation angle is a value plus 360 degrees. For example, the second index may have a value of 1 or 2. For instance, when the motor is an 8-pole motor, the candidates for the CA corresponding to the resolver electrical angle $\theta_e$ may be represented by a matrix of 4*2 and the first and second indexes may indicate the second engine rotation-angle CA, which is finally identified by the second engine rotation-angle identifier 470, among the candidates for the CA.

The second engine rotation-angle identifier 470 may control the engine based on the finally identified second engine rotation-angle CA.

In this case, the second engine rotation-angle identifier 470 may control the engine by transmitting a torque command to the engine control unit 210 of the vehicle.

The first and second indexes stored in the memory may be used to again estimate the second engine rotation-angle based on the stored first and second indexes and the rotor angle information of the motor next time the engine is started after the engine is off.

Figure 7:
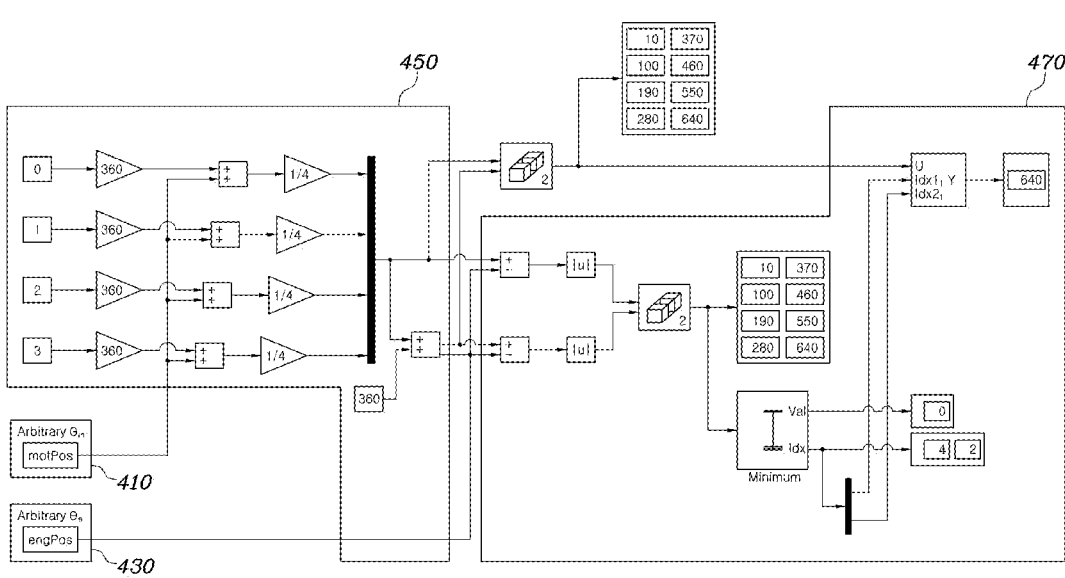
FIG. 7 illustrates that a synchronization operation unit according to an embodiment of the present disclosure estimates first and second indexes and a second engine rotation angle.

FIG. 7 illustrates that the synchronization operation unit according to an embodiment of the disclosure estimates first and second indexes and a second engine rotation-angle.

For example, the resolver electrical angle of the motor directly connected to the engine, which is acquired by the rotor angle acquirer 410, may be 40 degrees. Additionally, the first engine rotation-angle (Cacan) acquired by the first engine rotation-angle acquirer 430 may be 640 degrees.

In this case, the engine rotation-angle candidate generator 450 generates the candidates for the engine rotation-angle CA based on the resolver electrical angle $\theta_e$ acquired by the rotor angle acquirer 410. In this case, the generated candidates for the engine rotation-angle may for example be represented as a matrix of $$\begin{pmatrix} 10 & 370 \\ 100 & 400 \\ 190 & 550 \\ 280 & 640 \end{pmatrix}.$$

The second engine rotation-angle identifier 470 may identify the second engine rotation-angle as 640 degrees based on the minimum value of '0' among absolute values {630, 540, 450, 360, 270, 180, 90, 0} of the differences between the first engine rotation-angle (Cacan) of '640' and the engine rotation-angle candidates {10, 100, 190, 280, 370, 400, 550, 640}. In this case, because '640' is located in the fourth row and second column of the candidate matrix for the CA, the first and second indexes may be set to '4' and '2,' respectively.

The first and second indexes may be set when the engine is started for the first time and may be updated every time the rotation angle of the motor is increased by 360 degrees. The second engine rotation-angle identifier 470 may estimate the second engine rotation-angle based on the first and second indexes.

Further, when the engine is not started for the first time, the second engine rotation-angle may be estimated based on the first and second indexes stored in the memory or the like of the system.

Figure 8:
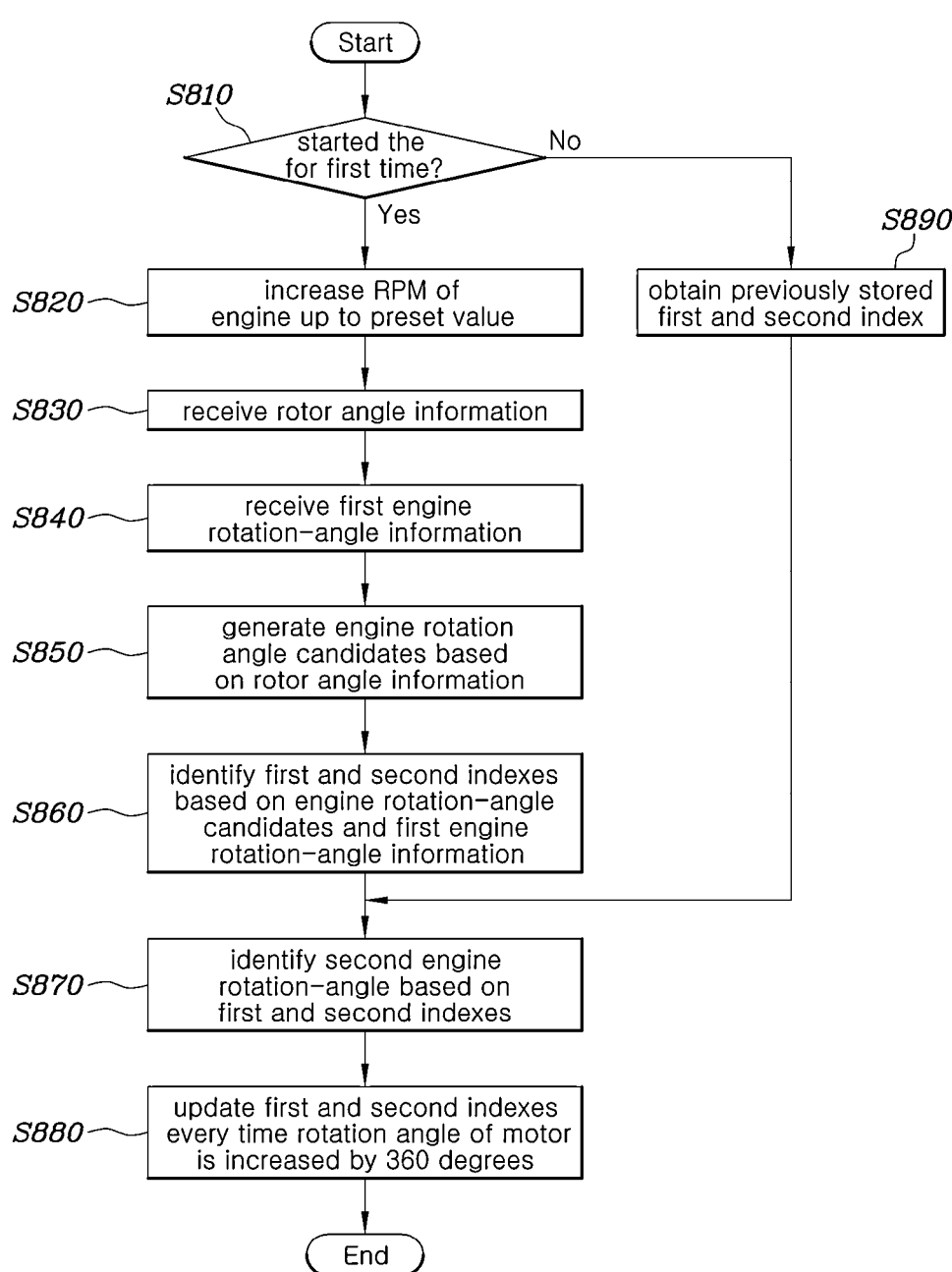
FIG. 8 is a flowchart describing an engine angular-position estimating method according to an embodiment of the present disclosure.

FIG. 8 is a flowchart describing an engine angular-position estimating method according to an embodiment of the present disclosure.

The engine angular-position estimating method according to the embodiment may be performed by the synchronization operation unit 390 of FIG. 3 or by a corresponding hybrid control unit (HCU) of a vehicle.

Referring to FIG. 8, the synchronization operation unit 390 identifies whether the engine is started for the first time (S810) and increases the revolutions per minute (RPM) of the engine up to a preset value when first starting the engine (S820).

In this case, the preset RPM of the engine may have an arbitrary value, e.g., 1000 RPM.

Further, the synchronization operation unit 390 receives the rotor angle information of the motor generated by a rotor angle operation unit (S830).

In this case, the rotor angle information of the motor above can be generated based on the information detected by the resolver.

Further, the synchronization operation unit 390 receives the first engine rotation-angle information generated by the engine rotation-angle operation unit (S840).

In this case, the first engine rotation-angle information may be generated based on information detected by the cam angle sensor or the crank angle sensor.

Further, the synchronization operation unit 390 generates engine rotation angle candidates based on the rotor angle information (S850).

In this case, the engine rotation-angle candidates may be generated based on Equation 3.

Further, the synchronization operation unit 390 identifies the first and second indexes based on the engine rotation-angle candidates and the first engine rotation-angle information (S860).

In this case, the first index (index1) corresponds to the value of N matched to the value of the CA obtained in Equation 4. The second index (index2) indicates whether two candidates for the CA, which correspond to one value of N, have a rotation angle less than or greater than 360 degrees, i.e., whether or not the rotation angle is a value plus 360 degrees. For example, the second index may have a value of 1 or 2. In other words, when the motor is an 8-pole motor, the candidates for the CA corresponding to the resolver electrical angle $\theta_e$ may be represented by a matrix of 4*2 and the first and second indexes may indicate the second engine rotation-angle CA, which is finally identified by the second engine rotation-angle identifier 470, among the candidates for the CA.

Further, the synchronization operation unit 390 identifies the second engine rotation-angle based on the first and second indexes (S870).

In this case, the synchronization operation unit 390 may identify the second engine rotation-angle based on the value indicated by the first and second indexes among the candidates for the CA.

Further, the synchronization operation unit 390 updates the first and second indexes every time the rotation angle of the motor is increased by 360 degrees (S880).

When it is identified in step S810 that the engine is not started for the first time, the previously stored first and second indexes are obtained (S890) and the second engine rotation-angle is identified based on the obtained first and second indexes (S870).

The identified second engine rotation-angle CA may be used to control the engine of the vehicle.

In this case, the synchronization operation unit 390 may control the engine by transmitting the torque command to the engine control unit 210 of the vehicle.

The first and second indexes may be stored in the memory and used to estimate the second engine rotation-angle again based on the stored first and second indexes and the rotor angle information of the motor next time the engine is started after the engine is off.

Figure 9:
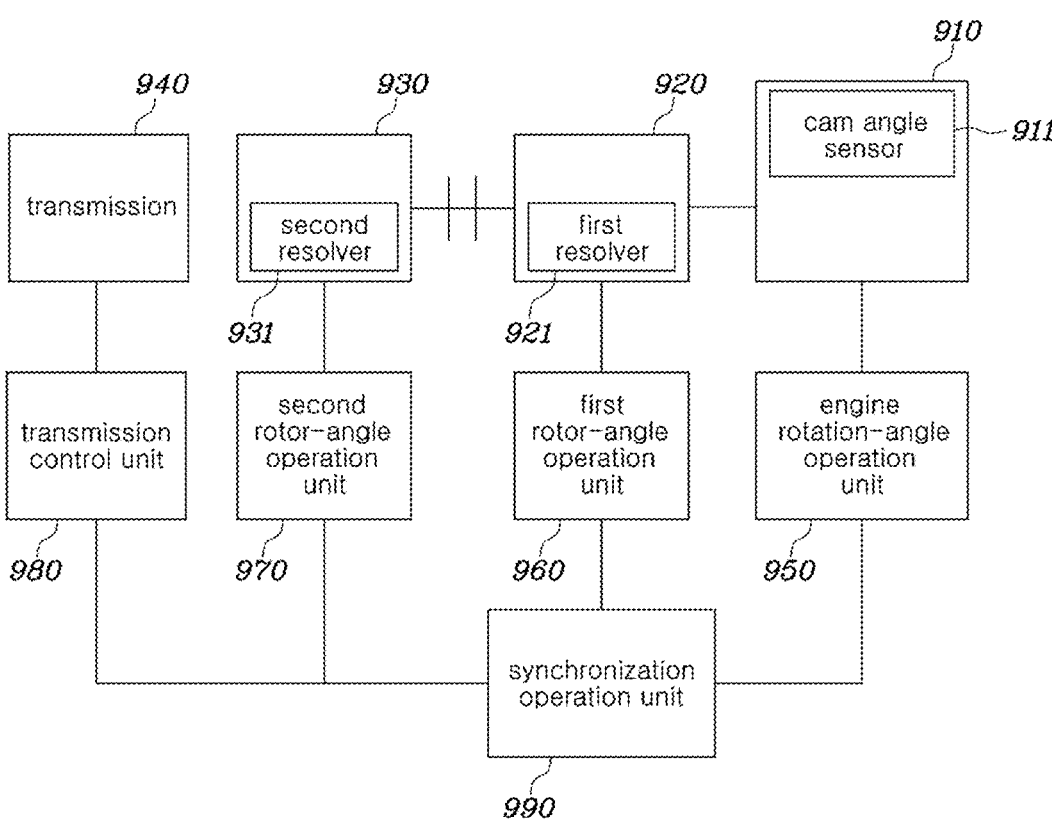
FIG. 9 is a block diagram of an engine angular-position estimating system according to another embodiment of the present disclosure.

FIG. 9 is a block diagram showing an engine angular-position estimating system according to another embodiment of the present disclosure.

Referring to FIG. 9, the engine angular-position estimating system according to the embodiment includes an engine 910, a first motor 920, a second motor 930, a transmission 940, an engine rotation-angle operation unit 950, a first rotor-angle operation unit 960, a second rotor-angle operation unit 970, a transmission control unit 980, and a synchronization operation unit 990.

Further, the engine 910 includes a cam angle sensor 911. The first motor 920 includes a first resolver 921. The second motor 930 includes a second resolver 922.

In the embodiment shown in FIG. 3, the engine 310 includes the cam angle sensor 311 and the crank angle sensor 313. The engine rotation-angle operation unit 350 generates the first engine rotation-angle based on the results of detecting the cam angle and the crank angle.

However, according to the embodiment described in FIG. 9, the engine 910 includes only the cam angle sensor 911. The engine rotation-angle operation unit 950 generates the first engine rotation-angle based on only a result of detecting the cam angle.

Figure 10:
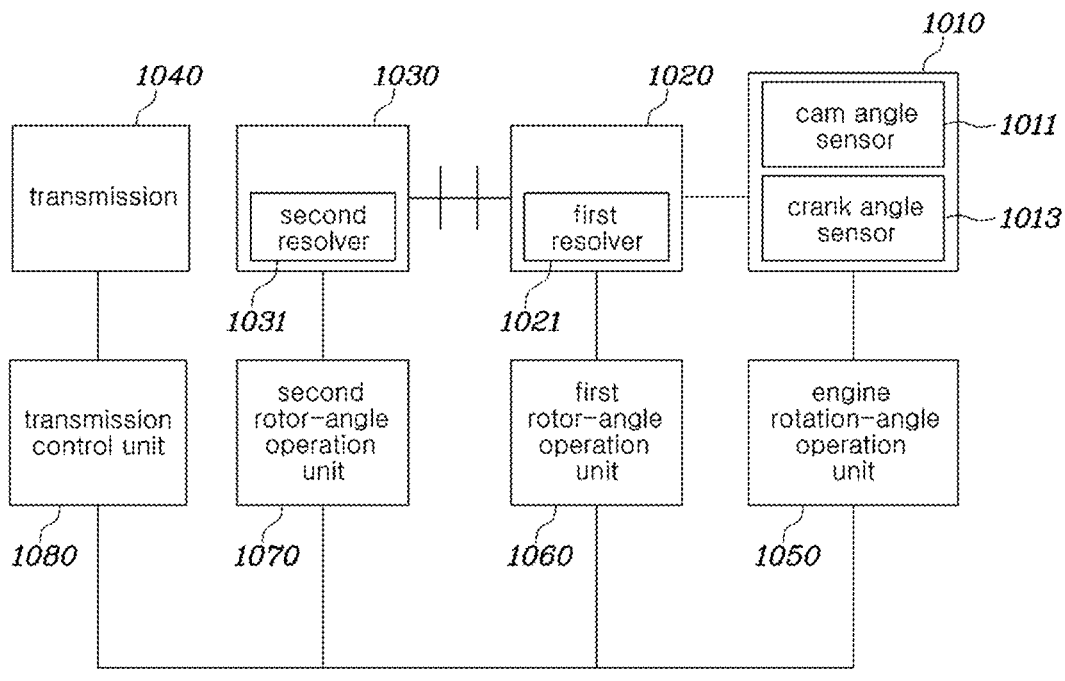
FIG. 10 is a block diagram of an engine angular-position estimating system according to still another embodiment of the present disclosure.

FIG. 10 is a block diagram of an engine angular-position estimating system according to still another embodiment of the present disclosure.

Referring to FIG. 10, the engine angular-position estimating system according to this embodiment includes an engine 1010, a first motor 1020, a second motor 1030, a transmission 1040, an engine rotation-angle operation unit 1050, a first rotor-angle operation unit 1060, a second rotor-angle operation unit 1070, and a transmission control unit 1080.

Further, the engine 1010 includes a cam angle sensor 1011 and a crank angle sensor 1013, the first motor 1020 includes a first resolver 1021, and the second motor 1030 includes a second resolver 1022.

In the embodiment shown in FIG. 3, the first engine rotation-angle identified by the engine rotation-angle operation unit 350 is transmitted to the synchronization operation unit 390 and the synchronization operation unit 390 identifies the second engine rotation-angle based on the first engine rotation-angle.

However, according to the embodiment described in FIG. 10, both functions of the engine rotation-angle operation unit 350 and the synchronization operation unit 390 are integrated into the engine rotation-angle operation unit 1050. Therefore, the engine rotation-angle operation unit 1050 identifies the first and second engine rotation-angles.

In this case, the engine rotation-angle operation unit 1050 may be implemented in the form of a hybrid engine control unit (HECU) where the engine control unit (ECU) and the hybrid control unit (HCU) are integrated.

In this case, the CAN communication between the HCU and ECU is not separately required, thereby reducing a time delay.

Figure 11A:
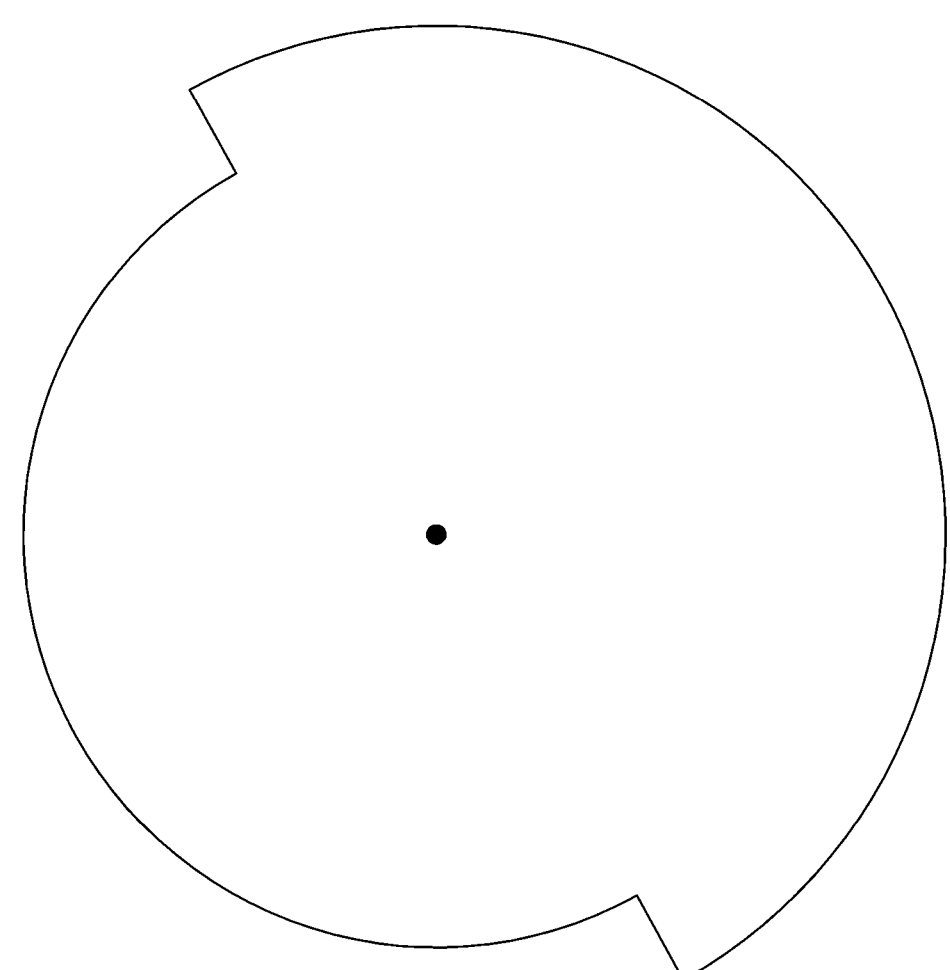
FIG. 11A shows an example of a target wheel usable in a camshaft of an engine according to an embodiment of the present disclosure.
Figure 11B:
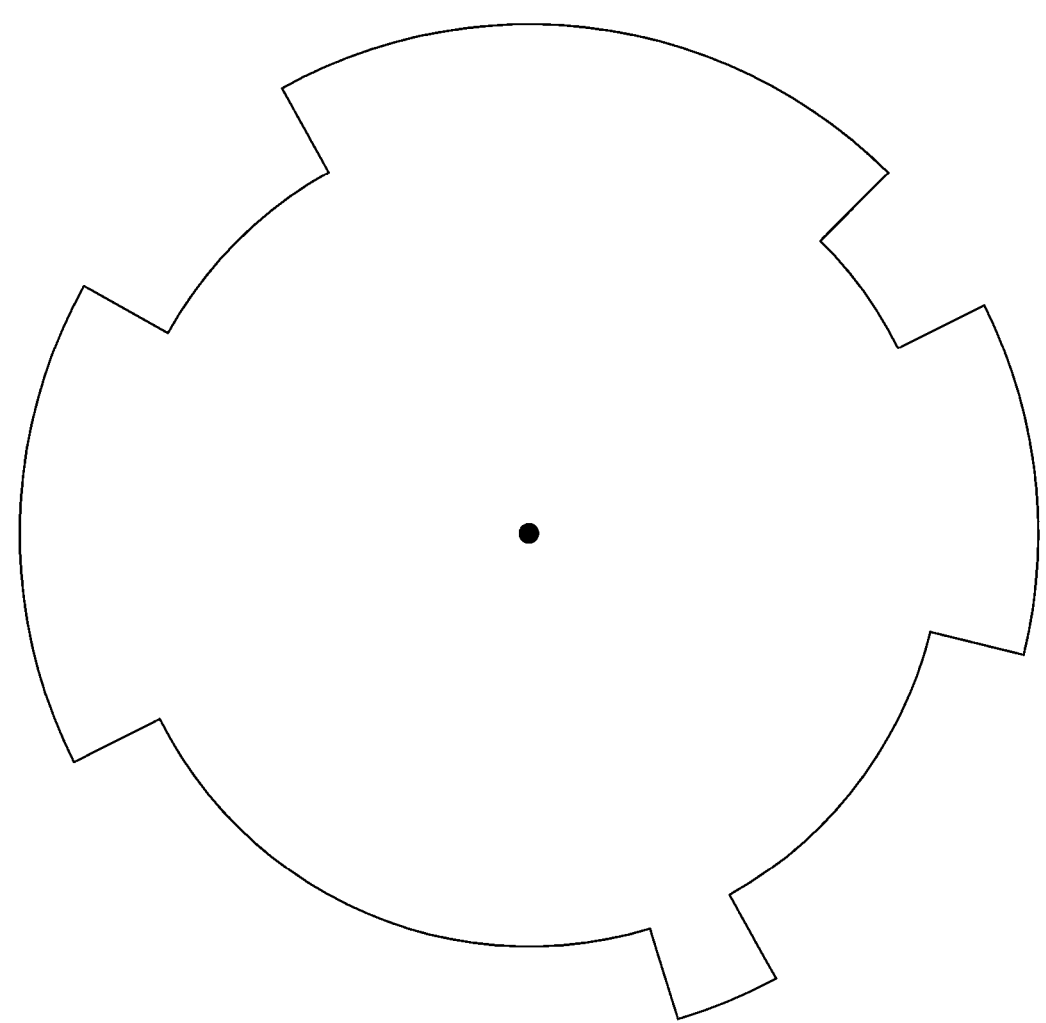
FIG. 11B shows another example of a target wheel usable in a camshaft of an engine according to an embodiment of the present disclosure.

FIG. 11A shows an example of a target wheel usable in a camshaft of an engine according to an embodiment of the present disclosure. FIG. 11B shows another example of a target wheel usable in a camshaft of an engine according to an embodiment of the present disclosure.

In the case of a half-moon-shaped target wheel as shown in FIG. 11A, not only the cam sensor but also the crank angle sensor is required to accurately measure the rotation angle of the engine. However, in the case of a target wheel with multiple protrusions as shown in FIG. 11B, the rotation angle of the engine can be measured only by the cam sensor without the crank angle sensor.

Figure 12:
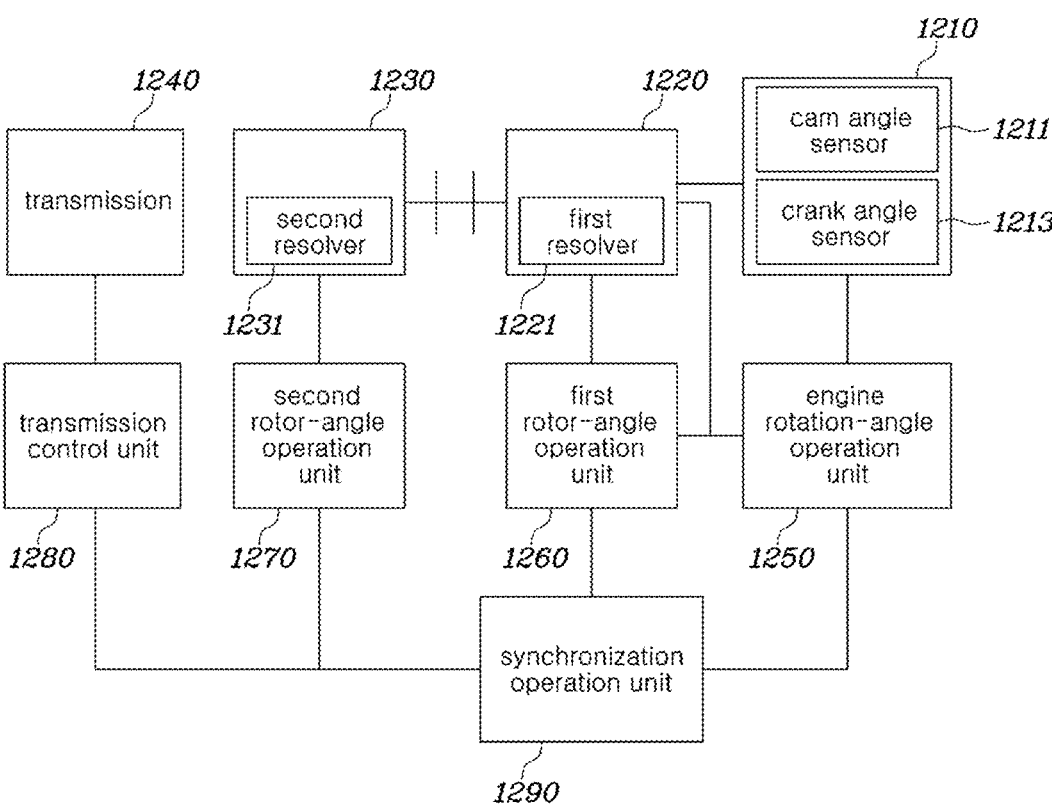
FIG. 12 is a block diagram of an engine angular-position estimating system according to still another embodiment of the disclosure.

FIG. 12 is a block diagram of an engine angular-position estimating system according to still another embodiment of the present disclosure.

Referring to FIG. 12, the engine angular-position estimating system includes an engine 1210, a first motor 1220, a second motor 1230, a transmission 1240, an engine rotation-angle operation unit 1250, a first rotor-angle operation unit 1260, a second rotor-angle operation unit 1270, a transmission control unit 1280, and a synchronization operation unit 1290.

Further, the engine 1210 includes a cam angle sensor 1211 and a crank angle sensor 1213. The first motor 1220 includes a first resolver 1221. The second motor 1230 includes a second resolver 1222.

Comparing the embodiment of FIG. 12 and the embodiment of FIG. 9, the embodiment of FIG. 9 shows that the first rotor angle operation unit 960 obtains the resolver electrical angle from the first resolver 921 provided in the first motor 920 directly connected to the engine 910 to generate the rotor angle of the motor. However, the embodiment of FIG. 12 shows that the engine rotation-angle operation unit 1250 obtains the resolver electrical angle from the first resolver 1221 to generate the rotor angle of the motor. Further, the engine rotation-angle operation unit 1250 may identify the rotor angle of the motor and the first engine rotation-angle. Furthermore, the engine rotation-angle operation unit 1250 identifies the second engine rotation-angle based on the rotor angle of the motor and the first engine rotation-angle.

In this case, the synchronization operation unit 1290 may be implemented in the form of a HECU where the ECU and the HCU are integrated.

In this case, the CAN communication between the HCU and ECU is not separately required, thereby reducing a time delay.

According to the foregoing embodiments of the present disclosure, when the performance or stability of an active noise control (ANC) system is deteriorated due to errors in secondary path modeling, the angular position of the engine is estimated based on the resolver signal of the motor, which has high resolution and is strong. As a result, performing main control of the engine with high resolution at accurate timing is achieved.

Further, the crank angle of the engine is processed in the same manner as previously done to perform the internal control of the engine. The motor synchronizes the angle position of the motor with the angle position of the engine, thereby smoothly performing vibration control that counteracts changes in the torque and speed of the engine through the motor.

In addition, the control of the engine is performed based on the existing engine crank angle signal processing, the control of the motor is performed based on the existing resolver-based motor position signal, and the hybrid control unit that distributes the torques of the engine and the motor distributes instantaneous torque in consideration of the phases of the engine and the motor. As a result, the instantaneous torque of the motor can offset the change in the instantaneous torque of the engine, thereby smoothly performing the vibration control that controls the change in the torque and speed of the engine through the motor at low RPM.

The present disclosure may be implemented as a computer-readable code on a medium where a program is recorded. The computer-readable medium includes any types of recording devices that store data that can be read by a computer system. For example, the computer-readable medium includes a hard disk drive (HDD), a solid-state disk (SSD), a silicon disk drive (SDD), a read only memory (ROM), a random-access memory (RAM), a compact disc (CD)-ROM, a magnetic tape, a floppy disk, an optical data storage device, and the like. Therefore, the foregoing detailed description should not be construed as limiting in all respects and should be considered for illustrative purposes. The scope of the present disclosure should be determined by reasonable interpretation of the appended claims, and any change within the equivalent scope of the present disclosure is included in the scope of the present disclosure.

What is claimed is:

1. A vibration control method of a hybrid electric vehicle, the vibration control method comprising:
   receiving rotor angle information of a motor of the hybrid electric vehicle generated based on information detected by a resolver;
   receiving first engine rotation-angle information of an engine of the hybrid electric vehicle generated based on information detected by a cam angle sensor or a crank angle sensor;
   generating a plurality of engine rotation-angle candidates based on the rotor angle information, wherein the number of the plurality of engine rotation-angle candidates is determined based on a number of poles of a motor rotor magnet of the hybrid electric vehicle and regardless of a pulse resolution of the crank angle sensor;

identifying a second engine rotation-angle based on the number of engine rotation-angle candidates and the first engine rotation-angle information; and
   controlling the engine based on the second engine rotation-angle.

2. The vibration control method of claim 1, wherein identifying the second engine rotation-angle comprises:
   identifying first and second indexes based on the engine rotation-angle candidates and the first engine rotation-angle information; and
   identifying the second engine rotation-angle based on the first and second indexes.

3. The vibration control method of claim 2, further comprising:
   storing the first and second indexes in a memory; and
   estimating the second engine rotation-angle again based on the stored first and second indexes and the rotor angle information of the motor next time an engine of the hybrid electric vehicle is started after the engine is turned off.

4. The vibration control method of claim 2, wherein the first and second indexes comprise values for indicating one of the engine rotation-angle candidates.

5. A hybrid electric vehicle comprising:
   one or more rotor-angle operation units configured to generate rotor angle information of a motor of the hybrid electric vehicle based on information detected by a resolver;
   an engine rotation-angle operation unit configured to generate first engine rotation-angle information of an engine of the hybrid electric vehicle based on information detected by a cam angle sensor or a crank angle sensor; and
   a synchronization operation unit configured to generate a plurality of engine rotation-angle candidates based on the rotor angle information, wherein the number of the plurality of engine rotation-angle candidates is determined based on a number of poles of a motor rotor magnet of the hybrid electric vehicle and regardless of a pulse resolution of the crank angle sensor, to identify a second engine rotation-angle based on the number of engine rotation-angle candidates and the first engine rotation-angle information, and to control the engine based on the second engine rotation-angle.

6. The hybrid electric vehicle of claim 5, wherein the synchronization operation unit identifies first and second indexes based on the engine rotation-angle candidates and the first engine rotation-angle information and identifies the second engine rotation-angle based on the first and second indexes.

7. The hybrid electric vehicle of claim 6, wherein the synchronization operation unit stores the first and second indexes in a memory and estimates the second engine rotation-angle again based on the stored first and second indexes and the rotor angle information of the motor a next time the engine is started after the engine is turned off.

8. The hybrid electric vehicle of claim 6, wherein the first and second indexes comprise values for indicating one of the engine rotation-angle candidates.

* * * * *